United States Patent
He

(10) Patent No.: US 11,967,132 B2
(45) Date of Patent: Apr. 23, 2024

(54) LANE MARKING DETECTING METHOD, APPARATUS, ELECTRONIC DEVICE, STORAGE MEDIUM, AND VEHICLE

(71) Applicant: Apollo Intelligent Connectivity (Beijing) Technology Co., Ltd., Beijing (CN)

(72) Inventor: Gang He, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 358 days.

(21) Appl. No.: 17/352,871

(22) Filed: Jun. 21, 2021

(65) Prior Publication Data

US 2021/0312195 A1    Oct. 7, 2021

(30) Foreign Application Priority Data

Dec. 16, 2020 (CN) .......................... 202011488643.7

(51) Int. Cl.
*G06V 10/764* (2022.01)
*G06F 18/214* (2023.01)
(Continued)

(52) U.S. Cl.
CPC .......... *G06V 10/764* (2022.01); *G06F 18/214* (2023.01); *G06V 10/774* (2022.01);
(Continued)

(58) Field of Classification Search
CPC .... G06V 10/764; G06V 10/82; G06V 20/588; G06V 20/46; G06F 18/214; G06T 7/73; G06T 2207/10016
See application file for complete search history.

(56) References Cited

U.S. PATENT DOCUMENTS 10,740,613 B1      8/2020 Sinclair
10,794,710 B1 *   10/2020 Liu ........................ G06V 20/58
(Continued)

FOREIGN PATENT DOCUMENTS

CN      107895492 A      4/2018
CN      108122249 A      6/2018
(Continued)

OTHER PUBLICATIONS

Lu, Sheng, Zhaojie Luo, Feng Gao, Mingjie Liu, KyungHi Chang, and Changhao Piao. 2021. "A Fast and Robust Lane Detection Method Based on Semantic Segmentation and Optical Flow Estimation" Sensors 21, No. 2: 400. https://doi.org/10.3390/s21020400 (Year: 2021).*

(Continued)

*Primary Examiner* — Wesley J Tucker
(74) *Attorney, Agent, or Firm* — Harness, Dickey & Pierce, P.L.C.

(57) ABSTRACT

A lane marking detecting method, an apparatus, an electronic device, a storage medium, a program product, and a vehicle, where a specific implementation includes: obtaining a video stream including a lane marking; extracting a key image frame from the video stream at a predetermined interval of frames, with an image frame between adjacent key image frames being a non-key image frame; detecting, for the key image frame, a lane marking according to a feature map of the key image frame; detecting, for the non-key image frame, a lane marking according to the non-key image frame and a feature map of a previous key image frame of the non-key image frame. In this embodiment, the feature map of the non-key image frame is determined and the lane marking is detected by combining the feature map of the previous key image frame, thus enabling flexibility and diversity in lane marking detection.

14 Claims, 7 Drawing Sheets

(51) Int. Cl.
*G06V 10/774* (2022.01)
*G06V 10/82* (2022.01)
*G06V 20/40* (2022.01)
*G06V 20/56* (2022.01)

(52) U.S. Cl.
CPC ............ *G06V 10/82* (2022.01); *G06V 20/588* (2022.01); *G06V 20/46* (2022.01)

(56) References Cited

U.S. PATENT DOCUMENTS

| | | | | |
|---|---|---|---|---|
| 11,619,496 | B2* | 4/2023 | Choi | B60R 11/04 701/532 |
| 11,733,398 | B2* | 8/2023 | Zhang | G01S 19/47 702/152 |
| 2014/0003709 | A1* | 1/2014 | Ranganathan | G06V 20/588 382/201 |
| 2017/0358092 | A1 | 12/2017 | Bleibel et al. | |
| 2018/0192035 | A1* | 7/2018 | Dabeer | G06V 20/588 |
| 2019/0163990 | A1 | 5/2019 | Mei et al. | |
| 2020/0098135 | A1 | 3/2020 | Ganjineh et al. | |
| 2020/0372792 | A1* | 11/2020 | Li | G06V 10/764 |
| 2021/0190526 | A1* | 6/2021 | Choi | G06V 20/58 |
| 2022/0019817 | A1* | 1/2022 | Li | G06V 20/588 |
| 2023/0106961 | A1* | 4/2023 | Hassan | G06V 10/82 348/135 |
| 2023/0134569 | A1* | 5/2023 | He | G06V 20/58 382/104 |
| 2023/0154157 | A1* | 5/2023 | Ehteshami Bejnordi | G06V 10/464 382/156 |

FOREIGN PATENT DOCUMENTS

| | | | |
|---|---|---|---|
| CN | 108242062 | A | 7/2018 |
| CN | 109978756 | A | 7/2019 |
| CN | 110135302 | A | 8/2019 |
| CN | 110427800 | A | 11/2019 |
| CN | 110443173 | A | 11/2019 |
| CN | 111178245 | A | 5/2020 |
| CN | 111209777 | A | 5/2020 |
| JP | 2019525515 | A | 9/2019 |
| WO | 2020103892 | A1 | 5/2020 |
| WO | 2020103893 | A1 | 5/2020 |
| WO | 2020172875 | A1 | 9/2020 |

OTHER PUBLICATIONS

Extended European Search Report for European application No. 21181451.2 dated Dec. 15, 2021, seven pages.
Dosovitskiy, Alexey et al.: "FlowNet: Learning Optical Flow with Convolutional Networks", 2015 IEEE International Conference on Computer Vision (ICCV), IEEE, Dec. 7, 2015, pp. 2758-2766, XP032866621, DOI: 10.1109/ICCV.2015.316.
Jianping, Gou et al.: "Knowledge Distillation: A Survey", arxiv.org, Cornell University Library, 201 Olin Library Cornell University Ithaca, NY 14853,; Oct. 23, 2020, 34 pages, XP081795698.
Lu, Sheng et al.: "A Fast and Robust Lane Detection Method Based on Semantic Segmentation and Optical Flow Estimation", Sensors, vol. 21, No. 2, Jan. 8, 2021, p. 400, XP055869828, DOI: 10.3390/s21020400.
Tang, Jigang et al.: "A review of lane detection methods based on deep learning", Pattern Recognition, Elsevier, GB, vol. III, Sep. 15, 2020, 15 pages, XP086395682, ISSN: 0031-3203, DOI: 10.1016/J.PATCOG.2020.107623.
Office Action dated Oct. 4, 2022 in corresponding Japanese Patent Application No. 2021-191751.
Office Action dated Sep. 21, 2022 in corresponding European Patent Application No. 21181451.2.
Dengzxin, Dai et al., "Dark Model Adaptation: Semantic Image Segmentation from Daytime to Nighttime", 2018 21st International Conference On Intellegent Transportation Systems (ITSC), IEEE, Nov. 4, 2018 (Nov. 4, 2018), pp. 3819-3824, XP0334740035, DOI: 10.1109/ITSC.2018.8569387.
Hou, Yuenan et al. "Learning Lightweight Lane Detection CNNs by Self Attention Distillation", Aug. 2, 2019, arXiv:1908.00821v1 [cs.CV], Aug. 2, 2019, 11 pages.
Alexey Dosovitskiy, "FlowNet: Learning Optical Flow with Convolutional Networks", 2015 IEEE International Conference on Computer Vision, dated Dec. 7, 2015.
Chinese Notice of Allowance regarding Patent Application No. 2020114886437, dated Sep. 19, 2023.
Korean Office Action regarding Patent Application No. 1020210179925, dated Nov. 27, 2023.

* cited by examiner

LANE MARKING DETECTING METHOD, APPARATUS, ELECTRONIC DEVICE, STORAGE MEDIUM, AND VEHICLE

CROSS-REFERENCE TO RELATED APPLICATIONS

This application claims priority to Chinese Patent Application No. 202011488643.7, filed on Dec. 16, 2020, entitled "LANE MARKING DETECTING METHOD, APPARATUS, ELECTRONIC DEVICE, STORAGE MEDIUM, AND VEHICLE", which is incorporated herein by reference in its entirety.

TECHNICAL FIELD

This application relates to computer technologies and image processing technologies and, in particular, to a lane marking detecting method, an apparatus, an electronic device, a storage medium, a program product, and a vehicle, which can be applied to artificial intelligence, driving automation, intelligent traffic, and deep learning.

BACKGROUND

With the popularization of vehicles and the development of vehicle automation technology, improving the safety and reliability of vehicle driving has become the common pursuit of vehicle providers and vehicle users, and lane marking detection is one of the important players in realizing the safety and reliability of vehicle driving.

In the prior art, a typically used lane marking detecting method is: collecting training samples in a training process, and training a base network model based on the training samples to obtain a lane marking detecting model. In an application process, a feature map can be determined for each image frame based on the trained lane marking detecting model, and lane marking detection can be performed on the feature map based on the lane marking detecting model.

However, since a feature map have to be determined for every image frame by the lane marking detecting model, low detection efficiency and high cost can be an issue.

SUMMARY

This application provides a lane marking detecting method, an apparatus, an electronic device, a storage medium, a program product, and a vehicle for improving the efficiency of lane marking detection.

According to an aspect of this application, a lane marking detecting method is provided, including:

obtaining a video stream including a lane marking, and extracting a key image frame from the video stream at a predetermined interval of frames, with an image frame between adjacent key image frames being a non-key image frame;

detecting, for the key image frame, a lane marking according to a feature map of the key image frame; and detecting, for the non-key image frame, a lane marking according to the non-key image frame and a feature map of a previous key image frame of the non-key image frame.

According to another aspect of this application, a lane marking detecting apparatus is provided, including:

an obtaining module, configured to obtain a video stream including a lane marking;

an extracting module, configured to extract a key image frame from the video stream at a predetermined interval of frames, with an image frame between adjacent key image frames being a non-key image frame;

a detecting module, configured to: detect, for the key image frame, a lane marking according to a feature map of the key image frame; and detect, for the non-key image frame, a lane marking according to the non-key image frame and a feature map of a previous key image frame of the non-key image frame.

According to still another aspect of this application, an electronic device is provided, including:

at least one processor; and a memory communicatively connected with the at least one processor, where the memory stores thereon instructions executable by the at least one processor, and the instructions are executed by the at least one processor to enable the at least one processor to execute the method according to the foregoing embodiments.

According to another aspect of this application, a non-transitory computer-readable storage medium is provided, storing thereon computer instructions that cause a computer to execute the method according to the foregoing embodiments.

According to still another aspect of this application, a computer program product is provided, including a computer program that, when executed by a processor, implements the method according to the foregoing embodiments.

According to still another aspect of this application, a vehicle is provided, including: an image collecting apparatus and the lane marking detecting apparatus according to the foregoing embodiments, where the image collecting apparatus is configured to collect a video stream including a lane marking.

It should be understood that what is described in this section is not intended to identify critical or important features of embodiments of this application, nor is it intended to limit the scope of this application. Other features of this application will be readily understood by the following specification.

BRIEF DESCRIPTION OF THE DRAWINGS

The drawings are used to facilitate understanding of this solution, and do not constitute any limitation on this application. In the drawings.

DESCRIPTION OF EMBODIMENTS

Now, exemplary embodiments of this application will be described with reference to the accompanying drawings, which include various details of the embodiments of this application to facilitate understanding, and shall be considered as merely exemplary. Therefore, those of ordinary skill in the art should appreciate that various changes and modifications can be made to the embodiments described herein without departing from the scope and spirit of this application. Also, for clarity and conciseness, descriptions of well-known functions and structures are omitted in the following description.

Figure 1:
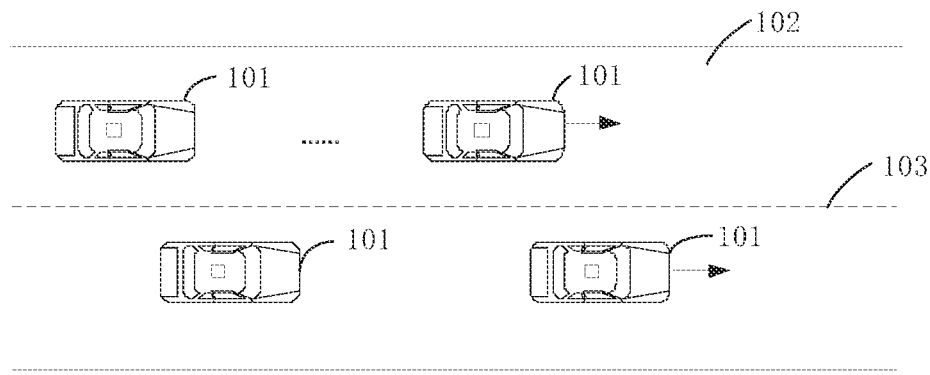
FIG. 1 is a schematic diagram according to a first embodiment of this application.

FIG. 1 is a schematic diagram according to a first embodiment of this application. In the application scenario of the lane marking detecting method shown in FIG. 1, a vehicle 101 is driving along a road 102. During a driving process, the vehicle 101 can detect a lane marking 103 on the road 102 in order to ensure the safety and reliability, etc., of the driving.

In related art, two methods are usually used to detect the lane marking. One method is: the vehicle 101 can be equipped with an image collecting apparatus (not shown in the drawing, and the image collecting apparatus can be a camera, a radar, etc.). The image collecting apparatus collects an image including a lane marking, and the vehicle 101 can perform coordinate calculation on the image including the lane marking, so as to realize the detection of the lane marking.

Another method is: the vehicle 101 pre-trains and stores a lane marking detecting model. Similarly, the vehicle 101 can be equipped with an image collecting apparatus (not shown in the drawing, and the image collecting apparatus can be a camera, a radar, etc.). The image collecting apparatus collects an image including a lane marking, and the vehicle 101 can perform lane marking detection on the image including the lane marking based on the lane marking detecting model.

However, if the first method is used to detect the lane marking, the amount of calculation will be high, the process will be overcomplicated, and the accuracy will be low. If the second method is used to detect the lane marking, every one of the collected images need to be processed by the lane marking detecting model for feature extraction and convolution, which may lead to low detection efficiency.

The inventor of this application has obtained the inventive concept of this application through creative work: a video stream including a lane marking can include key image frames and non-key image frames, where the key image frames are extracted based on a predetermined interval of frames. For the non-key image frames, lane marking detection can be realized by combining feature maps of the key image frames.

Based on the above inventive concept, this application provides a lane marking detecting method, an apparatus, an electronic device, a storage medium, a program product, and a vehicle, which are applied to the fields of driving automation, intelligent traffic, and deep learning in computer technologies and image processing technologies, so as to achieve the technical effect of improving the efficiency in lane marking detection.

Figure 2:
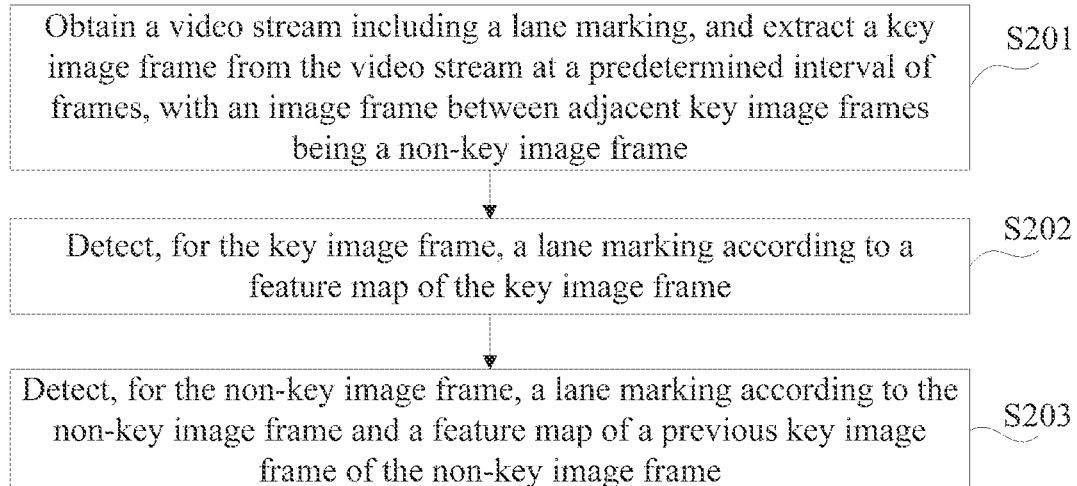
FIG. 2 is a schematic diagram according to a second embodiment of this application.

FIG. 2 is a schematic diagram according to a second embodiment of this application. As shown in FIG. 2, the lane marking detecting method of an embodiment of this application includes:

S201: obtain a video stream including a lane marking, and extract a key image frame from the video stream at a predetermined interval of frames, with an image frame between adjacent key image frames being a non-key image frame.

Illustratively, the execution entity of this embodiment may be a lane marking detecting apparatus, and the lane marking detecting apparatus may be a vehicle, and more specifically, may be a computer, a server, a processor, a vehicle-mounted terminal, and a chip (such as a vehicle-to-everything chip), etc., which are not limited in this embodiment.

In some embodiments, after acquiring a video stream including a lane marking, the lane marking detecting apparatus can extract individual image frames in the video stream, so as to perform lane marking detection based on the extracted image frames. Specifically, a predetermined interval of frames can be pre-configured, and images extracted based on the predetermined interval of frames are referred to as key image frames, while the other extracted images are referred to as non-key image frames.

For example, if the predetermined interval of frames is 10 frames, the images extracted by the lane marking detecting apparatus every 10 frames are key image frames.

It is worth noting that the predetermined interval of frames in the above example is merely for illustrative purposes, and cannot be understood as a limitation on the predetermined interval of frames. Rather, the predetermined interval of frames can be determined by the lane marking detecting apparatus based on the actual need, historical record, testing, etc., which will not be limited in this embodiment.

Now, using an example where the lane marking detecting method of this embodiment is applied to the application scenario shown in FIG. 1 and the lane marking detecting apparatus is an in-vehicle terminal provided in the vehicle, the steps are described in the following.

The vehicle is equipped with a camera (or some other image collecting apparatus) that collects a video stream including a lane marking and transmits the video stream to the in-vehicle terminal. The in-vehicle terminal extracts from the video stream a key image frame at a predetermined interval of frames (such as 10 frames), and treat the other extracted images as non-key image frames. That is, those between adjacent key image frames are the non-key image frames.

S202: detect, for the key image frame, a lane marking according to a feature map of the key image frame.

S203: detect, for the non-key image frame, a lane marking according to the non-key image frame and a feature map of a previous key image frame of the non-key image frame.

In this embodiment, images can be categorized into two different types, one of which is key image frames, and the other is non-key image frames. Additionally, the lane marking detecting apparatus can be implemented in different ways for different types of images. That is, for key image frames, one method is used for lane marking detection, and for non-key image frames, another method is used for lane marking detection.

For example, for a key image frame, the lane marking detecting apparatus can detect a lane marking according to a feature map of the key image frame.

Specifically, the lane marking detecting apparatus can determine a feature map of a key image frame, the feature map of the key image frame being used to represent a color feature, a texture feature, a form feature, and a spatial relationship feature of the key image frame.

For a non-key image frame, the lane marking detecting apparatus can determine a previous key image frame of the non-key image frame, determine the feature map of the previous key image frame, and detect a lane marking based on the non-key image frame and the feature map of the previous key image frame.

As can be known from the above analysis, in this embodiment, two different methods are used for detecting lane markings in two different types of images. Specifically, for the key image frame, the lane marking detection is performed according to the feature map of the key image frame, and for the non-key image frame, the lane marking detection is performed based on the non-key image frame and the feature map of the previous key image frame, thus avoiding a large amount of calculation and low efficiency associated with the above-mentioned prior art lane marking detection technologies, and realizing flexibility and diversity in the lane marking detection. Moreover, the lane marking detection is performed by combining the feature map of the previous key image frame, thus avoiding feature extraction and convolution calculation by the lane marking detecting model corresponding to every image frame, which improves the technical effect of the efficiency in lane marking detection.

Figure 3:
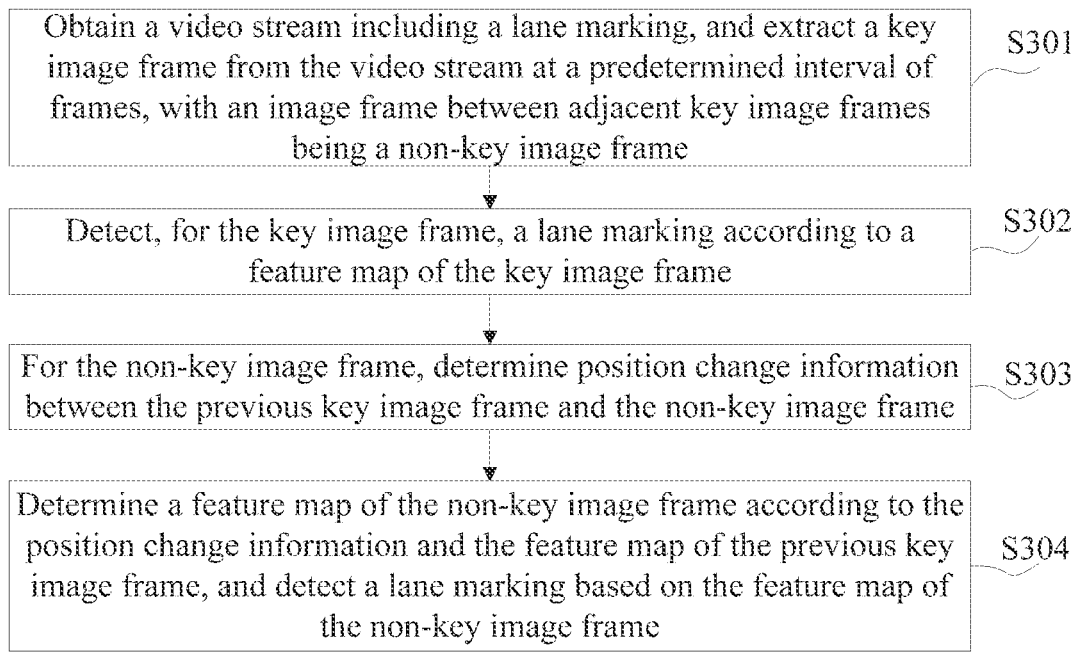
FIG. 3 is a schematic diagram according to a third embodiment of this application.

FIG. 3 is a schematic diagram according to a third embodiment of this application. As shown in FIG. 3, the lane marking detecting method of an embodiment of this application includes:

S301: obtain a video stream including a lane marking, and extract a key image frame from the video stream at a predetermined interval of frames, with an image frame between adjacent key image frames being a non-key image frame.

Illustratively, S201 can be referred to for more description about S301, which will not be repeated herein.

S302: detect, for the key image frame, a lane marking according to a feature map of the key image frame.

Illustratively, for more description about S302, refer to the detection of the key image frame by the lane marking detecting apparatus in the above examples, which will not be repeated herein.

Figure 4:
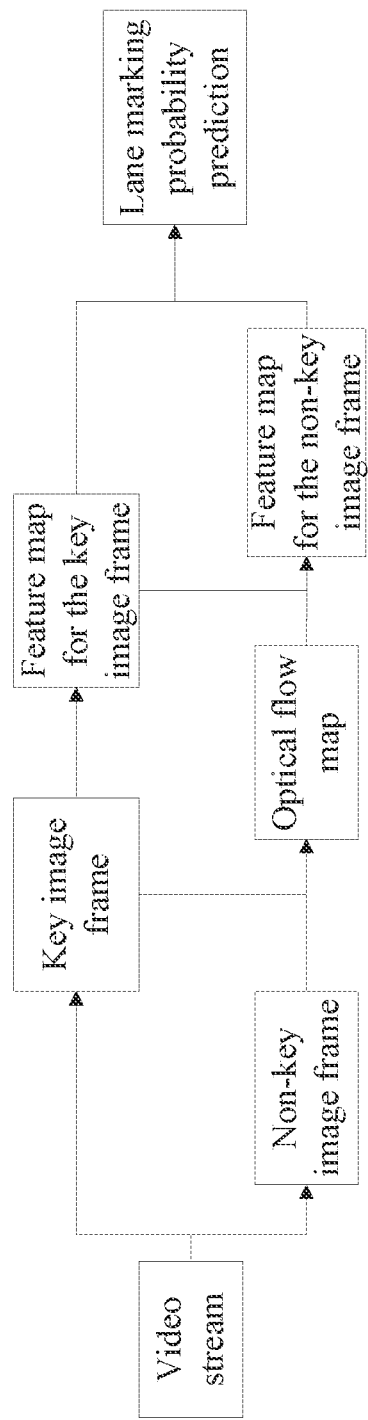
FIG. 4 is a schematic diagram of a principle of lane marking detection according to an embodiment of this application.

FIG. 4 is a schematic diagram of a principle of lane marking detection according to an embodiment of this application. As shown in FIG. 4, in this embodiment, a video stream includes two types of images, one is key image frames, and the other is non-key image frames. For the key image frames, the lane marking detecting apparatus can determine a feature map of a key image frame based on the key image frame, and after determining the feature map of the key image frame, detect a lane marking based on the feature map of the key image frame.

Additionally, in the schematic diagram shown in FIG. 4, the lane marking detection can be realized based on a method of lane marking probability prediction combining the key image frames.

S303: for the non-key image frame, determine position change information between the previous key image frame and the non-key image frame.

In some embodiments, the position change information includes position movement information of each pixel. S303 may include: feed the previous key image frame and the non-key image frame into an optical flow estimation network model to obtain an optical flow map between the previous key image frame and the non-key image frame.

The optical flow map represents the position movement information of each pixel of the non-key image frame relative to the previous key image frame.

For example, combining the above example and the schematic diagram shown in FIG. 4, the lane marking detecting apparatus can calculate the optical flow map between the non-key image frame and its previous key image frame, and this can, specifically, be implemented based on an optical flow estimation network generated by a training model.

In this embodiment, by determining the optical flow map that represents the position movement information of each pixel, the technical effect of improved reliability and accuracy in determining the position change information can be provided.

In some embodiments, a method for generating the optical flow estimation network model includes the following steps:

Step 1: collect a training sample set including a first sample image and a second sample image between which there is a relative displacement of lane markings.

The training sample set is used to train a base network model and generate the optical flow estimation network model. The training sample set includes sample images, and the sample images may include the first sample image and the second sample image, where the first sample image and the second sample image both include a lane marking, and there is a relative displacement between the lane marking in the first sample image and the lane marking in the second sample image.

It is worth noting that this embodiment does not limit the number of the first sample image and the second sample image, and the exact number can be specifically set by the lane marking detecting apparatus based on the actual need, historical record, testing, etc. Additionally, in some embodiments, the execution entity of the training for generating the optical flow estimation network model may be an apparatus other than the lane marking detecting apparatus, such as a cloud server.

Step 2: train a base network model to obtain the optical flow estimation network model based on the training sample set and with an optical flow field between the first sample image and the second sample image as a training label.

Illustratively, the optical flow field represents a two-dimensional instantaneous velocity field formed by all pixels in an image, that is, the optical flow field includes motion information of pixels in the image, such as the motion information about a pixel moving from the first sample image to the second sample image.

This step 2 can be specifically understood as: feed both the first sample image and the second sample image into the base network model for the base network model to: output predicted motion information between the first sample image and the second sample image; determine a loss function between the predicted motion information and the optical flow field (equivalent to a preset standard value); and adjust parameters of the base network model based on the loss function, such as coefficients of a convolution kernel of the base network model, until an optical flow estimation network model for which a loss function meets a preset requirement or the number of iterations reaches a threshold of a preset number of iterations is obtained.

It is worth noting that, in this embodiment, the optical flow estimation network model is obtained by training based on the first sample image and the second sample image including the lane markings, hence when the position change information is determined based on the optical flow estimation network model, the technical effect of improved efficiency and reliability in determining the position change information can be provided.

S304: determine a feature map of the non-key image frame according to the position change information and the feature map of the previous key image frame, and detect a lane marking based on the feature map of the non-key image frame.

Combining the above example and the schematic diagram shown in FIG. 4, the lane marking detecting apparatus can obtain the feature map of the non-key image frame based on the optical flow map and the feature map of the previous key image frame. Having determined the feature map of the non-key image frame, lane marking detection is performed based on the feature map of the non-key image frame.

Additionally, in the schematic diagram shown in FIG. 4, the lane marking detection can be realized based on a method of lane marking probability prediction combining the non-key image frames.

It is worth noting that, as can be seen by combining the above description of related art, every image frame have to go through the lane marking detecting model for the lane marking detection to perform feature extraction, convolution calculation and other operations on every image frame. This can lead to the problem of low efficiency in lane marking detection. Instead, in this embodiment, the feature map of the non-key image frame is obtained by combining the network estimation method, thus saving time and realizing improved efficiency in the determination of the feature map of the non-key image frame, which in turn achieves the technical effect of improving the efficiency in lane marking detection.

In some embodiments, S304 can include the following steps:

Step 1: determine, on the feature map of the non-key image frame, position information of each pixel of the previous key image frame according to the position change information.

Illustratively, if the position change information includes position change information of a horizontal coordinate (ux) and position change information of a vertical coordinate (uy), a pixel in the feature map of the previous key image frame has a horizontal coordinate (x1) and a vertical coordinate (y1), then the horizontal coordinate of the pixel on the feature map of the non-key image frame will be (x2=x1+ux), and the vertical coordinate will be (y2=y1+uy).

As used herein, the above coordinates are based on an image coordinate system.

Step 2: generate the feature map of the non-key image frame according to the position information and the feature map of the previous key image frame.

Illustratively, after determining the position information, i.e., the horizontal coordinate (x2=x1+ux) and the vertical coordinate (y2=y1+uy), the lane marking detecting apparatus can determine a feature map corresponding to the position information (i.e., the feature map of the non-key image frame) based on the position information and the feature map of the previous key image frame.

In this embodiment, the position information is determined based on the position change information, and the feature map of the non-key image frame is determined based on the position information, thus improving the efficiency in determining the feature map of the non-key image frame and saving the calculation load, which in turn realizes the technical effect of improving the efficiency in lane marking detection.

Figure 5:
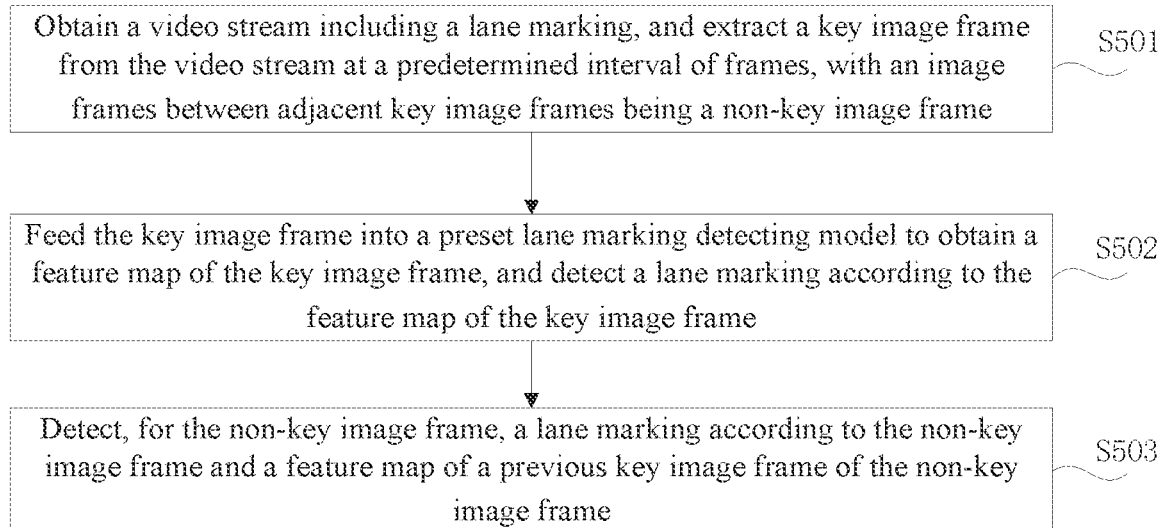
FIG. 5 is a schematic diagram according to a fourth embodiment of this application.

FIG. 5 is a schematic diagram according to a fourth embodiment of this application. As shown in FIG. 5, the lane marking detecting method of an embodiment of this application includes:

S501: obtain a video stream including a lane marking, and extract a key image frame from the video stream at a predetermined interval of frames, with an image frame between adjacent key image frames being a non-key image frame.

Illustratively, S201 can be referred to for more description about S501, which will not be repeated herein.

S502: feed the key image frame into a preset lane marking detecting model to obtain a feature map of the key image frame, and detect a lane marking according to the feature map of the key image frame.

The lane marking detecting model is generated through a knowledge distillation process based on a lane marking sample image in a daytime scenario and a lane marking sample image in a nighttime scenario.

In this embodiment, the lane marking detecting model detects lane marking in the key image frame based on the lane marking detecting model, and the lane marking detecting model in this embodiment is essentially different from the lane marking detecting model in the related art.

For example, in the related art, the lane marking detecting model is generated by training a base network model based on sample images. However, in this embodiment, on one hand, the sample images themselves are improved. Specifically, the collected sample images include a lane marking sample image in a daytime scenario and a lane marking sample image in a nighttime scenario, where the lane marking sample image in a daytime scenario is a sample image including a lane marking in the daytime, and the lane marking sample image in a nighttime scenario is a sample image including a lane marking in the nighttime.

In some embodiments, a method for obtaining the lane marking sample image in a nighttime scenario may include:

The lane marking detecting model trains a generative adversarial network (GAN) based on the lane marking sample image in the daytime scenario for training, generating an adversarial network about style transfer from daytime scenario to nighttime scenario. Then, based on the collected lane marking sample image in daytime scenario and the adversarial network about style transfer from the daytime scenario to the nighttime scenario, the lane marking sample image in the nighttime scenario is generated.

In this embodiment, the lane marking detecting model is generated by training based on the lane marking sample image in the daytime scenario and the lane marking sample image in the nighttime scenario, thus improving the lane marking detecting model in terms of detecting lane markings in different scenarios, thereby achieving the technical effect of improved accuracy and reliability in the lane marking detection.

On the other hand, the lane marking detecting model in this embodiment is obtained through a knowledge distillation process. That is, the lane marking detecting model is obtained by a larger model guiding a smaller model in learning and training, thus achieving the technical effect of improving the efficiency of the lane marking detecting model in lane marking detection.

In some embodiments, a method for the lane marking detecting apparatus to obtain a lane marking detecting model based on the knowledge distillation process can include the following steps:

Step 1: feed the lane marking sample image in a daytime scenario and the lane marking sample image in a nighttime scenario into a residual network model and a lightweight network model for a knowledge distillation process, respectively, to obtain a first lane marking recognition result outputted by the residual network model, and a second lane marking recognition result outputted by the lightweight network model.

This step can be understood as: feeding the lane marking sample image in the daytime scenario and the lane marking sample image in the nighttime scenario into the residual network model to obtain the first lane marking recognition result; and feeding the lane marking sample image in the daytime scenario and the lane marking sample image in the nighttime scenario into the lightweight network model to obtain the second lane marking recognition result.

Combining the above examples, the residual network model can be understood as the larger network model in the knowledge distillation process, the lightweight network model can be understood as the smaller network model in the knowledge distillation process, and the residual network model guides the lightweight network model in learning and training.

In some embodiments, the residual network model can be a resnet50, and the lightweight network model can be a shufflenet.

Step 2: iterate over the lightweight network model to obtain the lane marking detecting model based on the first lane marking recognition result and the second lane marking recognition result.

After the first lane marking recognition result and the second lane marking recognition result are obtained, the lightweight network model, such as a shufflenet, can be iterated based on the two results to obtain a lane marking detecting model using the lightweight network model as its base network model, thereby improving the efficiency in the lane marking detecting model in the application process, thus achieving the technical effect of improving the efficiency in the lane marking detection based on the lane marking detecting model.

In some embodiments, the first lane marking recognition result and the second lane marking recognition result each represents a probability distribution of the lane marking, and Step 2 can include the following sub-steps:

Sub-step 1: determine relative entropy information between the first lane marking recognition result and the second lane marking recognition result.

Here, the relative entropy information represents asymmetrical measurement information of a difference between the probability distributions of the lane marking.

Illustratively, the lane marking detecting apparatus can calculate a KL (Kullback-Leibler) divergence between the probability distribution corresponding to the first lane marking recognition result (hereinafter as the "first probability distribution" in order to distinguish from the probability distribution corresponding to the second lane marking recognition result) and the probability distribution corresponding to the second lane marking recognition result (similarly, hereinafter as the "second probability distribution" in order to distinguish from the probability distribution corresponding to the first lane marking recognition result), where the KL divergence represents asymmetrical measurement information of a difference between the first probability distribution and the second probability distribution.

Illustratively, the lane marking detecting apparatus can calculate the relative entropy information $LOSS_1$ based on Eq. 1:

$$LOSS_1 = p(x)*\log(p(x)) - p(x)*\log(q(x))$$

where p(x) is the first probability distribution outputted by the residual network model, and q(x) is the second probability distribution outputted by the lightweight network model.

Sub-step 2: determine loss information between the first lane marking recognition result and the second lane marking recognition result.

Here, the loss information represents distance information between the probability distributions of the lane marking.

Illustratively, the lane marking detecting apparatus can calculate loss information (Wasserstein loss) between the first probability distribution and the second probability distribution, and the Wasserstein loss represents distance information between the first probability distribution and the second probability distribution.

Illustratively, the lane marking detecting apparatus can calculate the relative entropy information $LOSS_2$ based on Eq. 2:

$$LOSS_2 = -E_{x \sim P_G}[D(x)]$$

where $E_{x \sim P_G}$ represents that the second probability distribution outputted by the lightweight network model obeys the distribution $P_G$, and D(x) is difference information between a predicted value of the lightweight network model (i.e., the second probability distribution) and a true value (a preset value).

Sub-step 3: iterate over the lightweight network model to obtain the lane marking detecting model according to the relative entropy information and the loss information.

Illustratively, the lane marking detecting apparatus determines an adjustment range for adjusting the lightweight network model based on the relative entropy information and the loss information, and adjusts the lightweight network model based on the adjustment range. Specifically, coefficients of the convolution kernel of the lightweight network model can be adjusted to obtain the lane marking detecting model.

It is worth noting that, in this embodiment, the relative entropy information and the loss information are determined, and iterative optimization is applied to the lightweight network model based on the information of the two dimensions, thus obtaining the lane marking detecting model, which can improve the lane marking detecting model in terms of the technical effect of improving the accuracy and reliability of the lane marking detecting model, and improving the efficiency of lane marking detection based on the lane marking detecting model.

S503: detect, for the non-key image frame, a lane marking according to the non-key image frame and a feature map of a previous key image frame of the non-key image frame.

Illustratively, S203 can be referred to for more description about S503, or S303 and S304 can also be referred to, which will not be repeated herein.

It is worth noting that, in some embodiments, the lane marking probability prediction may be a part of the lane marking detecting model. In that case, the lane marking detecting apparatus can feed the key image frame into the lane marking detecting model to perform feature extraction based on the lane marking detecting model to obtain the feature map of the key image frame, and predict the lane marking probability of the feature map of the key image frame in order to realize lane marking detection for the key image frame. For the non-key image frame, an optical flow map can be determined based on the key image frame and the non-key image frame, and the feature map of the non-key image frame can be determined based on the feature map of the key image frame and the optical flow map, and lane marking detection can be performed on the feature map of the non-key image frame based on the lane marking probability predicted in the lane marking detecting model.

In an example, after the lane marking detecting apparatus performs lane marking detection on the video stream and the lane marking detection result is obtained, the lane marking detecting apparatus can control the driving of the vehicle based on the lane marking detection result.

In another example, after the lane marking detecting apparatus performs lane marking detection on the video stream and the lane marking detection result is obtained, the lane marking detecting apparatus can transmit the lane marking detection result to a control apparatus installed in the vehicle for the control apparatus to control the driving of the vehicle based on the lane marking detection result.

Figure 6:
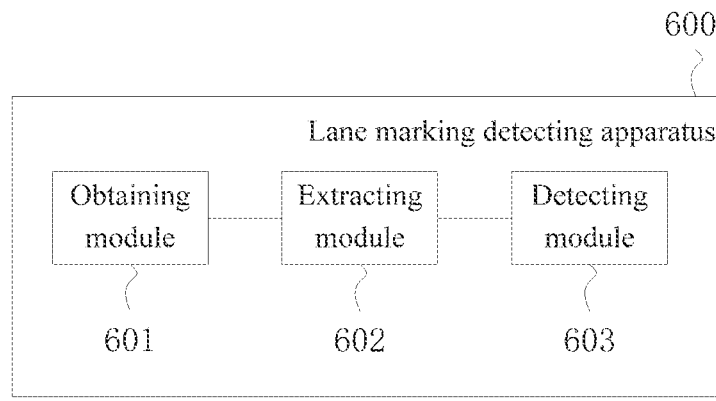
FIG. 6 is a schematic diagram according to a fifth embodiment of this application.

FIG. 6 is a schematic diagram according to a fifth embodiment of this application. As shown in FIG. 6, a lane marking detecting apparatus 600 of an embodiment of this application includes:
- an obtaining module 601, configured to obtain a video stream including a lane marking;
- an extracting module 602, configured to extract a key image frame from the video stream at a predetermined interval of frames, with an image frame between adjacent key image frames being a non-key image frame;
- a detecting module 603, configured to: detect, for the key image frame, a lane marking according to a feature map of the key image frame; and detect, for the non-key image frame, a lane marking according to the non-key image frame and a feature map of a previous key image frame of the non-key image frame.

Figure 7:
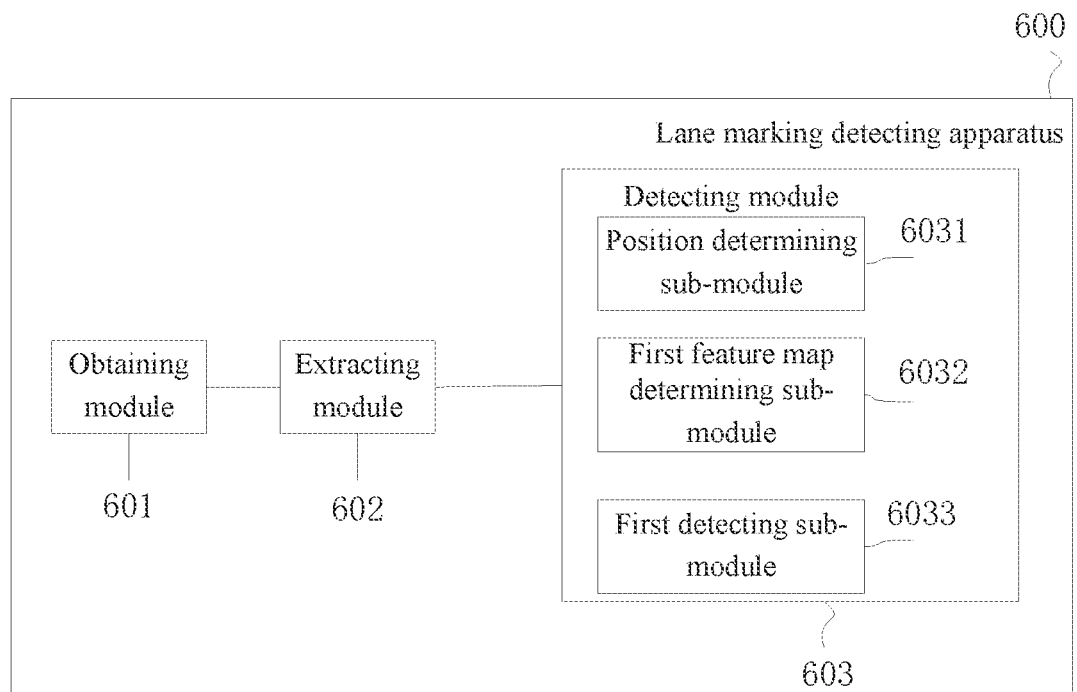
FIG. 7 is a schematic diagram according to a sixth embodiment of this application.

FIG. 7 is a schematic diagram according to a sixth embodiment of this application. As shown in FIG. 7, on the basis of the fifth embodiment, the detecting module 603 includes:
- a position determining sub-module 6031, configured to determine position change information between the previous key image frame and the non-key image frame;
- a first feature map determining sub-module 6032, configured to determine a feature map of the non-key image frame according to the position change information and the feature map of the previous key image frame; and
- a first detecting sub-module 6033, configured to detect a lane marking based on the feature map of the non-key image frame.

In some embodiments, the position change information includes position movement information of each pixel, and the position determining sub-module 6031 is configured to feed the previous key image frame and the non-key image frame into an optical flow estimation network model to obtain an optical flow map between the previous key image frame and the non-key image frame, where the optical flow map represents the position movement information of each pixel of the non-key image frame relative to the previous key image frame.

Figure 8:
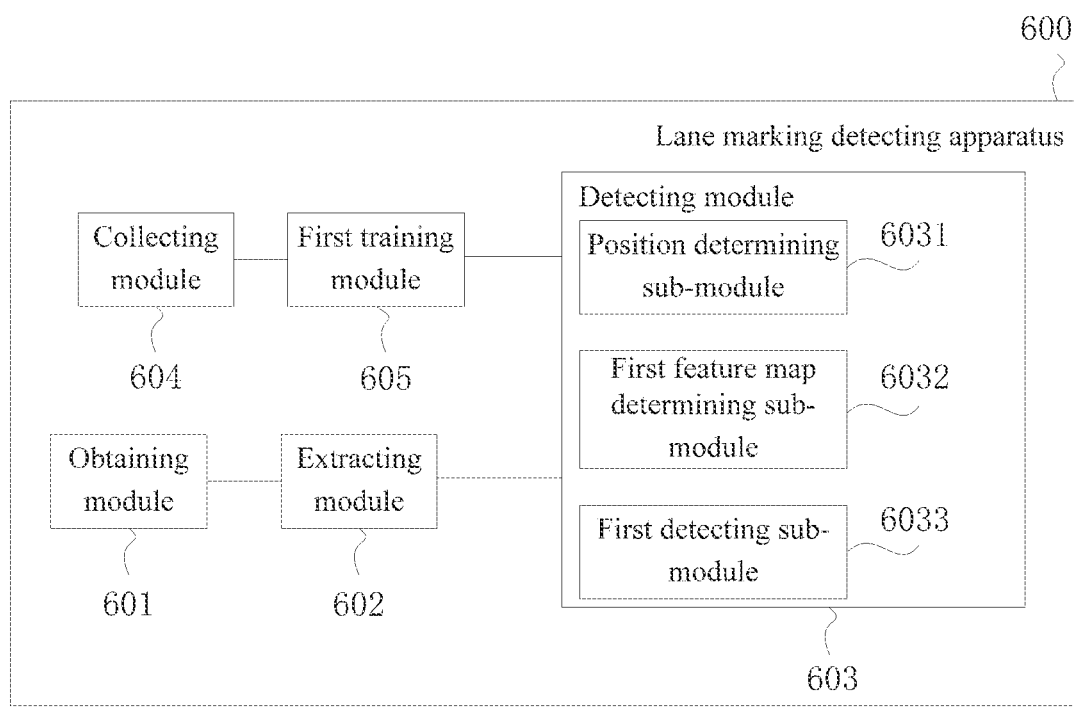
FIG. 8 is a schematic diagram according to a seventh embodiment of this application.

FIG. 8 is a schematic diagram according to a seventh embodiment of this application. As shown in FIG. 8, on the basis of the sixth embodiment, the lane marking detecting apparatus 600 further includes:
- a collecting module 604, configured to collect a training sample set including a first sample image and a second sample image between which there is a relative displacement of lane markings; and
- a first training module 605, configured to train a base network model to obtain the optical flow estimation network model based on the training sample set and with an optical flow field between the first sample image and the second sample image as a training label.

In some embodiments, the first feature map determining sub-module 6032 is configured to: determine, on the feature map of the non-key image frame, position information of each pixel of the previous key image frame according to the position change information; and generate the feature map of the non-key image frame according to the position information and the feature map of the previous key image frame.

Figure 9:
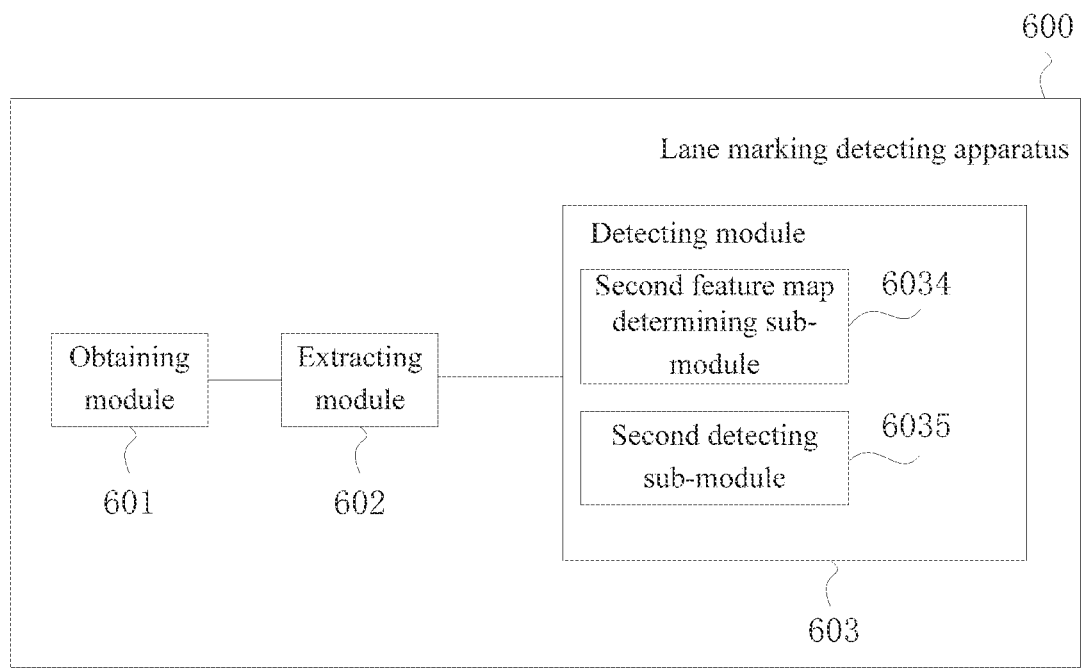
FIG. 9 is a schematic diagram according to an eighth embodiment of this application.

FIG. 9 is a schematic diagram according to an eighth embodiment of this application. As shown in FIG. 9, on the basis of the fifth embodiment, the detecting module 603 includes:
- a second feature map determining sub-module 6034, configured to feed the key image frame into a preset lane marking detecting model to obtain the feature map of the key image frame; and
- a second detecting sub-module 6035, configured to detect a lane marking according to the feature map of the key image frame, where the lane marking detecting model is generated through a knowledge distillation process based on a lane marking sample image in a daytime scenario and a lane marking sample image in a nighttime scenario.

Figure 10:
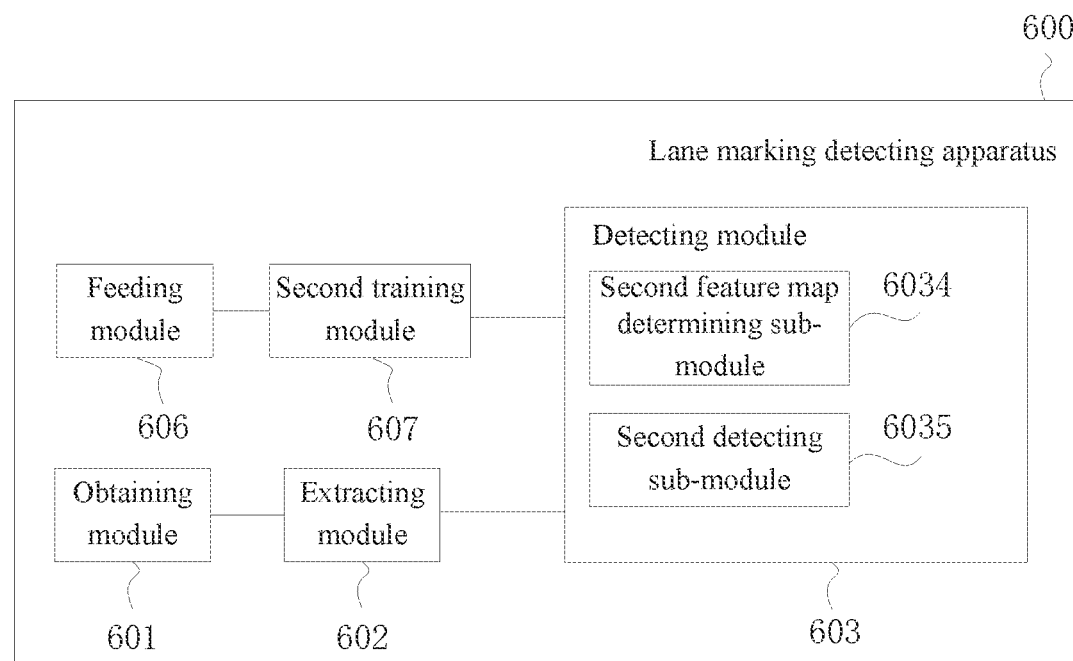
FIG. 10 is a schematic diagram according to a ninth embodiment of this application.

FIG. 10 is a schematic diagram according to a ninth embodiment of this application. As shown in FIG. 10, on the basis of the eighth embodiment, the lane marking detecting apparatus 600 further includes:
- a feeding module 606, configured to feed the lane marking sample image in a daytime scenario and the lane marking sample image in a nighttime scenario into a residual network model and a lightweight network model for a knowledge distillation process, respectively, to obtain a first lane marking recognition result outputted by the residual network model, and a second lane marking recognition result outputted by the lightweight network model; and
- a second training module 607, configured to iterate over the lightweight network model to obtain the lane marking detecting model based on the first lane marking recognition result and the second lane marking recognition result.

Figure 11:
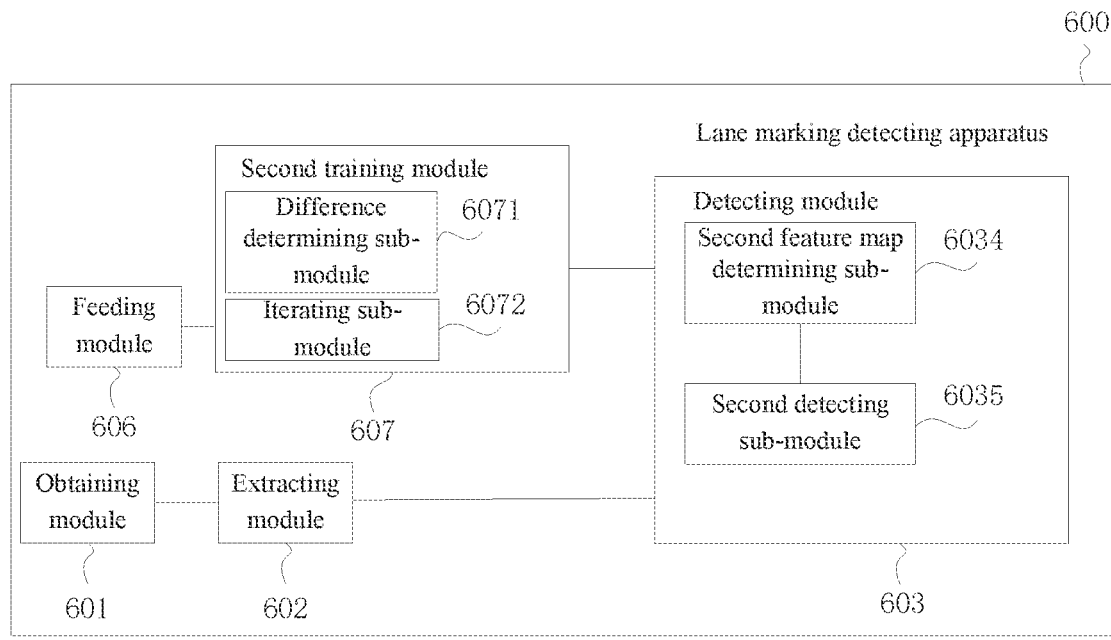
FIG. 11 is a schematic diagram according to a tenth embodiment of this application.

FIG. 11 is a schematic diagram according to a tenth embodiment of this application. As shown in FIG. 11, on the basis of the ninth embodiment, the first lane marking recognition result and the second lane marking recognition result each represents a probability distribution of the lane marking, and the second training module 607 includes:
- a difference determining sub-module 6071, configured to: determine relative entropy information between the first lane marking recognition result and the second lane marking recognition result, and determine loss information between the first lane marking recognition result and the second lane marking recognition result, where the relative entropy information represents asymmetrical measurement information of a difference between probability distributions of the lane marking, and the loss information represents distance information between the probability distributions of the lane marking; and
- an iterating sub-module 6072, configured to iterate over the lightweight network model to obtain the lane marking detecting model according to the relative entropy information and the loss information.

According to an embodiment of this application, an electronic device and a readable storage medium are also provided.

Figure 12:
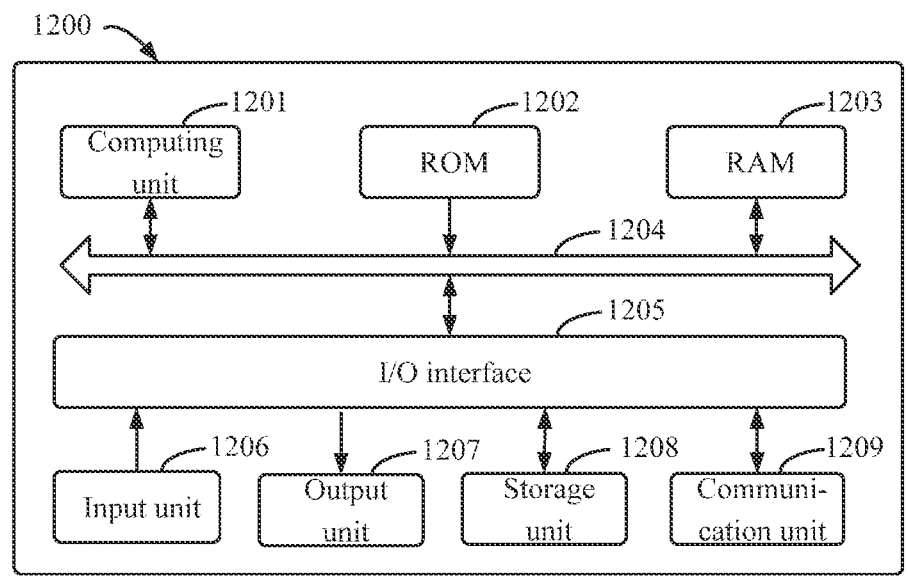
FIG. 12 is a schematic diagram according to an eleventh embodiment of this application.

FIG. 12 shows a schematic block diagram of an example electronic device 1200 that can be used to implement embodiments of this application. The electronic device is intended to represent a digital computer in various forms, such as a laptop computer, a desktop computer, a workstation, a personal digital assistant, a server, a blade server, a mainframe, and/or other appropriate computers. The electronic device may also represent a mobile apparatus in various forms, such as a personal digital processing, a cellular phone, a smart phone, a wearable device, and/or other similar computing devices. The components, their connections and relationships, and their functions as illustrated herein are merely examples, and are not intended to limit the implementation of this application described and/or required herein.

As shown in FIG. 12, the electronic device 1200 includes a computing unit 1201 that can carry out various appropriate actions and processing based on a computer program stored in a read-only memory (ROM) 1202 or a computer program loaded from a storage unit 1208 into a random access memory (RAM) 1203. In the RAM 1203, various programs and data required for the operation of the device 1200 can also be stored. The calculating unit 1201, the ROM 1202, and the RAM 1203 are mutually connected via a bus 1204. An input/output (I/O) interface 1205 is also connected to the bus 1204.

Multiple components in the device 1200 are connected to the I/O interface 1205, including: an input unit 1206, such as a keyboard, a mouse, etc.; an output unit 1207, such as various types of displays, speakers, etc.; a storage unit 1208, such as a magnetic disk, an optical disk, etc.; and a communication unit 1209, such as a network adapter, a modem, a wireless communication transceiver, etc. The communication unit 1209 allows for the device 1200 to exchange information/data with other devices via a computer network, such as the Internet and/or various telecommunication networks.

The computing unit 1201 can be various general-purpose and/or special-purpose processing components with processing and computing capabilities. Some examples of computing unit 1201 include, but are not limited to, a central processing unit (CPU), a graphics processing unit (GPU), various special purpose artificial intelligence (AI) computing chips, various computing units that run machine learning model algorithms, a digital signal processor (DSP), and any appropriate processor, controller, microcontroller, etc. The calculating unit 1201 executes the various methods and processing as described in the foregoing, e.g., the lane marking detecting method. For example, in some embodiments, the lane marking detecting method may be implemented as a computer software program which is tangibly contained in a machine-readable medium, such as the storage unit 1208. In some embodiments, partial or the entire computer program may be loaded and/or installed on the device 1200 via the ROM 1202 and/or the communication unit 1209. When the computer program is loaded into the RAM 1203 and executed by the calculating unit 1201, one or more steps of the lane marking detecting method described in the foregoing can be executed. Alternatively, in other embodiments, the computing unit 1201 may be configured to execute the lane marking detecting method in any other suitable manner (e.g., by means of firmware).

Various implementations of the systems and technologies described herein can be implemented in a digital electronic circuit system, an integrated circuit system, a field programmable gate array (FPGA), an application-specific integrated circuit (ASIC), an application-specific standard product (ASSP), a system-on-chip (SOC), a load programmable logic device (CPLD), computer hardware, firmware, software, and/or a combination thereof. These various embodiments may include: implementations in one or more computer programs, which are executable by and/or interpreted on a programmable system including at least one programmable processor, the programmable processor may be application specific or general-purpose and can receive data and instructions from a storage system, at least one input apparatus and/or at least one output apparatus, and can transmit the data and instructions to the storage system, the at least one input apparatus, and the at least one output apparatus.

The program codes used to implement the method of this application can be written in any combination of one or more programming languages. These program codes can be provided to a processor or controller of a general-purpose computer, a special-purpose computer, or other programmable data processing devices, so that when the program codes are executed by the processor or controller, a function/operation specified in the flowcharts and/or block diagrams is implemented. The program code can be executed entirely on a machine, partly on a machine, or as an independent software package that is partly executed on a machine and partly on a remote machine, or entirely on a remote machine or server.

In the context of this application, a machine-readable medium may be a tangible medium, which can contain or store a program for use by, or in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the foregoing. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with the user, the systems and technologies described herein can be implemented on a computer that has: a display apparatus (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of devices may also be used to provide interaction with the user. For example, the feedback provided to the user may be any form of sensory feedback (e.g., a visual feedback, an auditory feedback, or a haptic feedback), and may be in any form (including an acoustic input, a voice input, or a haptic input) to receive input from the user.

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of a communication network include: a local area network (LAN), a wide area network (WAN), the Internet, and blockchain network.

The computer system may include a client and a server. The client and server are typically remote from each other and interact via a communication network. The client-server relationship is created by computer programs running on respective computers having a client-server relationship with each other. The server can be a cloud server, also known as a cloud computing server or a cloud host. It is a mainframe product in the cloud computing service system to solve shortcomings in the traditional physical mainframe and VPS service (Virtual Private Server) associated with difficulties in administrations and low business scalability. The server can also be a server of a distributed system, or a server combined with a blockchain.

According to another aspect of embodiments of this application, an embodiment of this application also provides a computer program product, including a computer program which, when being executed by a processor, implements the method as described in any one of the above embodiments, such as the method shown in any one of the embodiments in FIG. 2, FIG. 3, and FIG. 5.

According to another aspect of embodiments of this application, an embodiment of this application also provides a vehicle, including: an image collecting apparatus and the lane marking detecting apparatus as described in any one of the above embodiments (e.g., including the lane marking detecting apparatus shown in any one of the embodiments of FIG. 6 to FIG. 11), where the image collecting apparatus is configured to collect a video stream including a lane marking.

Illustratively, the vehicle can be equipped with the lane marking detecting apparatus and the image collecting apparatus. The image collecting apparatus collects a video stream including a lane marking and transmits the video stream to the lane marking detecting apparatus. The lane marking detecting apparatus is configured to execute the lane marking detecting method as described in any one of the above embodiments (e.g., to execute the lane marking detecting method shown in any one of the embodiments of FIG. 2, FIG. 3, and FIG. 5), so as to realize the detection of the lane marking.

In some embodiments, the vehicle can be equipped with a controller, and the lane marking detecting apparatus can transmit the lane marking detection result to the controller for the controller to control the vehicle to travel based on the lane marking detection result.

It should be understood that the various forms of processes shown above can be reordered, and steps may be add or removed. For example, various steps described in this application can be executed in parallel, in sequence, or in alternative orders. As long as the desired results of the technical solutions disclosed in this application can be achieved, no limitation is imposed herein.

The foregoing specific implementations do not constitute any limitation on the protection scope of this application. It should be understood by those skilled in the art that various modifications, combinations, sub-combinations and substitutions may be made as needed by design requirements and other factors. Any and all modification, equivalent substitution, improvement or the like within the spirit and concept of this application shall fall within the protection scope of this application.

What is claimed is:

1. A lane marking detecting method, comprising:
obtaining a video stream comprising a lane marking;
extracting a key image frame from the video stream at a predetermined interval of frames, with an image frame between adjacent key image frames being a non-key image frame;
detecting, for the key image frame, a lane marking according to a feature map of the key image frame; and
detecting, for the non-key image frame, a lane marking according to the non-key image frame and a feature map of a previous key image frame of the non-key image frame;
wherein the detecting, for the key image frame, a lane marking according to a feature map of the key image frame comprises:
feeding the key image frame into a preset lane marking detecting model to obtain the feature map of the key image frame, and detecting a lane marking according to the feature map of the key image frame,
wherein the lane marking detecting model is generated through a knowledge distillation process based on a lane marking sample image in a daytime scenario and a lane marking sample image in a nighttime scenario,
wherein before the feeding the key image frame into a preset lane marking detecting model to obtain the feature map of the key image frame, and detecting a lane marking according to the feature map of the key image frame, the method further comprises:
feeding the lane marking sample image in a daytime scenario and the lane marking sample image in a nighttime scenario into a residual network model and a lightweight network model for a knowledge distillation process, respectively, to obtain a first lane marking recognition result outputted by the residual network model, and a second lane marking recognition result outputted by the lightweight network model; and
iterating over the lightweight network model to obtain the lane marking detecting model based on the first lane marking recognition result and the second lane marking recognition result.

2. The method according to claim 1, wherein the detecting, for the non-key image frame, a lane marking according to the non-key image frame and a feature map of a previous key image frame of the non-key image frame comprises:
determining position change information between the previous key image frame and the non-key image frame; and
determining a feature map of the non-key image frame according to the position change information and the feature map of the previous key image frame, and detecting a lane marking based on the feature map of the non-key image frame.

3. The method according to claim 2, wherein the position change information comprises position movement information of each pixel, and the determining position change information between the previous key image frame and the non-key image frame comprises:
feeding the previous key image frame and the non-key image frame into an optical flow estimation network model to obtain an optical flow map between the previous key image frame and the non-key image frame, wherein the optical flow map represents the position movement information of each pixel of the non-key image frame relative to the previous key image frame.

4. The method according to claim 3, further comprising:
collecting a training sample set comprising a first sample image and a second sample image between which there is a relative displacement of lane markings; and
training a base network model to obtain the optical flow estimation network model based on the training sample set and using an optical flow field between the first sample image and the second sample image as a training label.

5. The method according to claim 2, wherein the determining a feature map of the non-key image frame according to the position change information and the feature map of the previous key image frame comprises:
determining, on the feature map of the non-key image frame, position information of each pixel of the previous key image frame according to the position change information; and
generating the feature map of the non-key image frame according to the position information and the feature map of the previous key image frame.

6. The method according to claim 1, wherein the first lane marking recognition result and the second lane marking recognition result each represents a probability distribution of the lane marking, and the iterating over the lightweight network model to obtain the lane marking detecting model based on the first lane marking recognition result and the second lane marking recognition result comprises:
determining relative entropy information between the first lane marking recognition result and the second lane marking recognition result, and determining loss information between the first lane marking recognition result and the second lane marking recognition result, wherein the relative entropy information represents asymmetrical measurement information of a difference between probability distributions of the lane marking, and the loss information represents distance information between the probability distributions of the lane marking; and
iterating over the lightweight network model to obtain the lane marking detecting model according to the relative entropy information and the loss information.

7. An electronic device, comprising:
at least one processor; and
a memory communicatively connected with the at least one processor,
wherein the memory stores thereon instructions executable by the at least one processor, and the instructions are executed by the at least one processor to enable the at least one processor to:
obtain a video stream comprising a lane marking;
extract a key image frame from the video stream at a predetermined interval of frames, with an image frame between adjacent key image frames being a non-key image frame;
detect, for the key image frame, a lane marking according to a feature map of the key image frame; and
detect, for the non-key image frame, a lane marking according to the non-key image frame and a feature map of a previous key image frame of the non-key image frame;
wherein the at least one processor is further enabled to:
feed the key image frame into a preset lane marking detecting model to obtain the feature map of the key image frame, and detect a lane marking according to the feature map of the key image frame,
wherein the lane marking detecting model is generated through a knowledge distillation process based on a lane marking sample image in a daytime scenario and a lane marking sample image in a nighttime scenario,
wherein the at least one processor is further enabled to:
feed the lane marking sample image in a daytime scenario and the lane marking sample image in a nighttime scenario into a residual network model and a lightweight network model for a knowledge distillation process, respectively, to obtain a first lane marking recognition result outputted by the residual network model, and a second lane marking recognition result outputted by the lightweight network model; and
iterate over the lightweight network model to obtain the lane marking detecting model based on the first lane marking recognition result and the second lane marking recognition result.

8. The electronic device according to claim 7, wherein the at least one processor is further enabled to:
determine position change information between the previous key image frame and the non-key image frame; and
determine a feature map of the non-key image frame according to the position change information and the feature map of the previous key image frame, and detect a lane marking based on the feature map of the non-key image frame.

9. The electronic device according to claim 8, wherein the position change information comprises position movement information of each pixel, and the at least one processor is further enabled to:
feed the previous key image frame and the non-key image frame into an optical flow estimation network model to obtain an optical flow map between the previous key image frame and the non-key image frame, wherein the optical flow map represents the position movement information of each pixel of the non-key image frame relative to the previous key image frame.

10. The electronic device according to claim 9, wherein the at least one processor is further enabled to:
collect a training sample set comprising a first sample image and a second sample image between which there is a relative displacement of lane markings; and
train a base network model to obtain the optical flow estimation network model based on the training sample set and use an optical flow field between the first sample image and the second sample image as a training label.

11. The electronic device according to claim 8, wherein the at least one processor is further enabled to:
determine, on the feature map of the non-key image frame, position information of each pixel of the previous key image frame according to the position change information; and
generate the feature map of the non-key image frame according to the position information and the feature map of the previous key image frame.

12. The electronic device according to claim 7, wherein the first lane marking recognition result and the second lane marking recognition result each represents a probability distribution of the lane marking, and the at least one processor is further enabled to:
determine relative entropy information between the first lane marking recognition result and the second lane marking recognition result, and determine loss information between the first lane marking recognition result and the second lane marking recognition result, wherein the relative entropy information represents asymmetrical measurement information of a difference between probability distributions of the lane marking, and the loss information represents distance information between the probability distributions of the lane marking; and iterate over the lightweight network model to obtain the lane marking detecting model according to the relative entropy information and the loss information.

13. A non-transitory computer readable storage medium, storing thereon computer instructions that enable a computer to implement the method according to claim 1.

14. A vehicle, comprising: an image collecting apparatus and the electronic device according to claim 7,
wherein the image collecting apparatus is configured to collect a video stream comprising a lane marking.

\* \* \* \* \*